United States Patent [19]

Faroudja et al.

[11] Patent Number: 4,847,681
[45] Date of Patent: Jul. 11, 1989

[54] LOW LEVEL TELEVISION SIGNAL TRANSITION BOOSTER

[75] Inventors: Yves C. Faroudja, 26595 Anacapa Dr., Los Altos Hills, Calif. 94022; Jack J. Campbell, San Francisco, Calif.

[73] Assignee: Yves C. Faroudja, Los Altos, Calif.

[21] Appl. No.: 178,126

[22] Filed: Apr. 6, 1988

[51] Int. Cl.$^4$ .......................... H04N 9/64; H04N 5/14
[52] U.S. Cl. ........................................ 358/37; 358/166
[58] Field of Search .................................. 358/37, 166

[56] References Cited

U.S. PATENT DOCUMENTS

| | | | |
|---|---|---|---|
| 4,030,121 | 6/1977 | Faroudja | 358/37 |
| 4,262,304 | 4/1981 | Faroudja | 358/37 |
| 4,263,616 | 4/1981 | Lee | 358/166 |
| 4,414,564 | 11/1983 | Hitchcock | 358/37 |
| 4,509,080 | 4/1985 | Lagoni | 358/37 |
| 4,731,660 | 3/1988 | Faroudja et al. | 358/37 |

Primary Examiner—John W. Shepperd
Attorney, Agent, or Firm—David B. Harrison

[57] ABSTRACT

In a television system a transition level signal booster decreases transition time of low level transitions within a video signal without creating artifacts incident to high level transitions within the video signal. The booster includes an input for receiving the video signal, an output for putting out a main path video signal in which transition times of low level transitions have been decreased, a main path for the video signal extending between the input and the output, the main path including a main path adder means for adding a transition boost signal to the video signal, a transition boost signal generator including a connection to said input for receiving the video and for generating the transition boost signal, the generator comprising: a high frequency transition signal generator for generatigng a high frequency transition signal incident to the detection of a transition level in the video signal, a wave shaper including a first path having a delay match in series therein for putting out a first signal and a second path in parallel with the first path, the second path including sign removal and shaper means therein for generating a second control signal having a decreasing amplitude for each video transition having a magnitude above a predetermined amount, a first multiplier for multiplying the first signal by the second signal to generate the transition boost signal, said multiplier being connected to said main path adder means so that said transition boost signal may be added to the main path video signal, thereby to decrease the transition times of low transition levels.

28 Claims, 12 Drawing Sheets

FIG. 1

FIG. 2 WAVEFORMS OF FIG. 1

| AN EXAMPLE OF BOOST CONTROLLED VALUES | |
|---|---|
| COLOR | BOOST INCREASE |
| MONOCHROME | 0 db |
| 20% TO 40% RED | +3 db |
| 40% RED AND ABOVE | +6 db |
| BLUE (40 TO 100%) | +6 db |
| YELLOW GREEN CYAN (40 TO 100%) | +2 db |

FIG. 4: CONTROL OF BOOST LEVEL BY CHROMA CONDITIONS

FIG. 5: USE IN ENCODER

FIG. 6: USE IN DECODER

FIG. 9 SCHEMATICS P.3 MULTIPLIERS

LOW LEVEL TELEVISION SIGNAL TRANSITION BOOSTER

FIELD OF THE INVENTION

The present invention relates to nonlinear signal processing of television video signals. More particularly, the present invention relates to method and apparatus for decreasing transition time of low level transitions within a video signal without creating artifacts incident to high level transitions within the video signal.

BACKGROUND OF THE INVENTION

In 1981 co-inventor Faroudja patented a low level/-signal booster for television transitions as represented by U.S. Pat. No. 4,262,304, reference to which is made for further particulars. The system and method set forth in the referenced '304 patent has worked very satisfactorily over the years in providing low level video transitions with shortened durations. However, as effective bandwidths for composite color video signals have continued to increase, within the standard formats such as NTSC and PAL, certain compromises and drawbacks present in the prior approach taught by the referenced '304 patent have come to light.

In the referenced '304 patent, because the shaper circuit 16 had a low pass filter characteristic, a compromise was required between purity of large signal response and sharpness of small signal response. With substantial low pass filtering at the shaper element 16 of the referenced '304 patent, the correction waveform F' is as shown in the left column of waveforms (high levels) of FIG. 2 thereof. However, the low level transition waveform G" of the right column was not as sharp as it would have been, because of the presence of the substantial low pass filter characteristic of the shaper circuit 16.

However, with a mild effect low pass filter characteristic at the shaper 16, the low level signal transitions exemplified by FIG. 2 waveform G" were considerably sharpened, with the concomitant considerable drawback that at high transition levels the high level correction signal F' was not flat as shown in FIG. 2, left column. Rather, the F' signal included sinusoidal amplitude pollution characteristics during the waveform C' excursions, leading to pollution of high level transitions in the video path.

Thus, the approach described in the referenced '304 patent required a compromise between sharpness of low transition level picture detail and ringing of high transition level picture detail; a compromise caused by the particular characteristics of the low pass filter selected for the shaper circuit 16. The results achieved by the methods and apparatus described in the referenced '304 patent were excellent for limited bandwidth applications; but are now becoming inefficient for many present day applications requiring a full bandwidth correction path under all transition level conditions.

The advantages of chrominance/luminance spectrum separation preprocessing and postprocessing techniques within a television system are discussed in the co-inventors, U.S. Pat. No. 4,731,660, reference to which is made for further particulars. It has been discovered by the present co-inventors that the referenced chrominance/luminance spectrum separation preprocessing and postprocessing techniques described in the referenced '660 patent are advantageously enhanced further by addition of the television signal transition booster of the present invention.

SUMMARY OF THE INVENTION WITH OBJECTS

A primary object of the present invention is to provide a television signal processing method and system which overcomes mainpath bandwidth limitations and process compromises of the prior art approaches by providing a low level transition booster which considerably shortens low level transition times thereby adding to fine picture detail without any degradation of the picture at instances of high level signal transitions.

A further object of the present invention is to provide a television signal processing method and system which effectively removes signal degrading process elements from the signal boost generation path, thereby enabling the video signal bandwidth to remain uncompromised at high level video transitions while being extended and enhanced at low level video transitions.

In accordance with the principles of the present invention a transition level signal booster is provided within a television signal path. The transition level signal booster decreases transition time of low level transitions within a video signal without creating artifacts incident to high level transitions within the video signal.

The booster apparatus in accordance with the present invention includes an input for receiving the video signal, an output for putting out a main path video signal in which transition times of low level transitions have been decreased, a main path for the video signal extending between the input and the output, the main path including a main path adder for adding a transition boost signal in proper time and phase to the video signal, and a transition boost signal generator including a connection to the input for receiving the video and for generating the transition boost signal.

The transition boost signal generator includes a high frequency transition signal generation circuit for generating a high frequency transition signal incident to the detection of a transition level in said video signal. One preferred embodiment of this circuit is a second differentiator. The generator also includes a wave shaping circuit including a first path having a delay match in series therein for putting out a first signal, and a second path in parallel with the first path, the second path including a sign removal and shaper circuit therein for generating a second signal having a decreasing amplitude for each video transition above a predetermined amount. This wave shaping circuit may preferably include a full wave rectifier to perform the sign removal function.

The generator further includes a multiplier circuit for multiplying the first signal by the second signal to generate the transition boost signal. The multiplier is connected to the main path adder so that the transition boost signal may thereby be added to the main path video signal. The result is a video signal in which transition times of low transition levels are decreased without any degradation of high transition levels.

In one aspect of the present invention, the transition boost signal generator includes an adjustable threshold circuit for enabling the transition boost signal to be generated only for low transition level video signals above a threshold level, such as noise, for example.

In another aspect of the present invention the boost signal generator wave shaping circuit includes in the second path thereof a full wave rectifier for removing the sign of the second control signal; a multiple-tap delay line connected to the double rectifier for delaying the second control signal by a plurality of substantially equal time delay increments; a most positive signal selection circuit connected to the double rectifier and to the tapped delay line for selecting and putting out the most positive signal received from the full wave rectifier and from the plural time delay increment taps; a low pass filter connected to the most positive signal selection circuit for low pass filtering the most positive signal selected; and, an analog comparator for comparing the low pass filtered signal and a dc reference value to put out as said second signal a zero value signal throughout intervals of large level video transitions and a non-zero value approaching unity value throughout intervals of low level video transitions.

The method of the present invention includes the steps of:

receiving the incoming video signal at a main path input, adding a transition boost signal to the video signal in the main path, putting out at an output a main path video signal in which transition times of low transition levels have been decreased, generating the transition boost signal from the incoming video signal by:

generating a high frequency transition signal incident to the detection of a transition level in the video signal, wave shaping the high frequency transition signal including:

passing the transition signal through a delay matching first path for putting out a first signal, and passing the transition signal through a second path wherein the sign of the transition signal is removed and the resulting absolute value thereof is shaped in accordance with a predetermined curve having a decreasing amplitude for each video transition of an amplitude above a predetermined amount, and multiplying of the first signal by the second signal in order to yield the transition boost signal.

These and other objects, advantages, aspects and features of the present invention will be more fully understood and appreciated by those skilled in the art upon consideration of the following detailed description of preferred embodiments, presented in conjunction with the accompanying drawings.

DETAILED DESCRIPTION OF PREFERRED EMBODIMENTS

Figure 1:
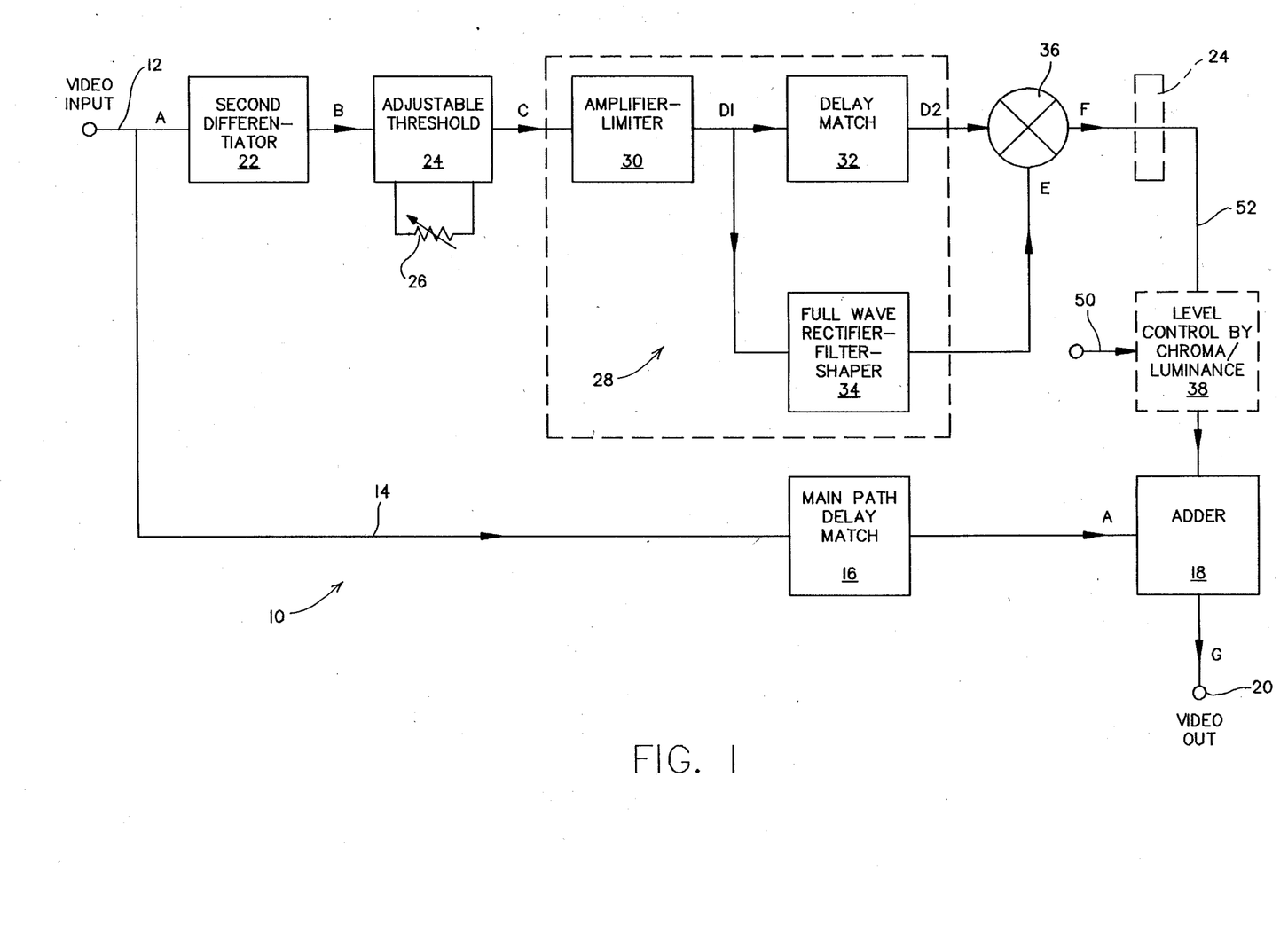
FIG. 1 is a block diagram of a signal booster apparatus embodying the principles of the present invention.

A detail processor 10 incorporating the principles of the present invention is shown in architectural overview in the block diagram of FIG. 1. Therein, the processor 10 includes a video input 12, a main signal path 14 (including a main path delay matching circuit 16), a main path adder circuit 18 and a video output 20.

A boost signal is generated by the other elements of the FIG. 1 circuit and is added at the main path adder circuit 18 to provide a video output signal at the output 20 in which low level transitions have had transition duration shortened and in which there is no degradation of high level transitions.

The other elements of the FIG. 1 circuit include a high frequency transition signal generation circuit 22, preferably, but not necessarily implemented as a second differentiation circuit. For example, other known techniques may be employed to obtain high frequency transition signals incident to transitions in the video signal arriving at the input 12. One technique is to use a first differentiator and wave shaping circuitry which obtains a usefully equivalent signal without being precisely a second derivative of the signal.

An adjustable threshold circuit 24 is provided to avoid any increase in high frequency noise components, should noise be present in the incoming video signal. An adjustment resistor 16 enables the circuit 24 to be adjusted, e.g. to three times the measured RMS average noise value in the incoming video signal. As shown in FIG. 1 the adjustable threshold circuit 24 preferably follows the high frequency transition signal generation circuit 22 in situations in which the detail processor 10 is incorporated into broadcast studio or transmission equipment. In this professional environment, the sensitivity of the threshold adjustment control 26 presents no significant drawback to the trained technical personnel. On the other hand, when the detail processor 10 is incorporated into consumer equipment operated by essentially untrained people, placement of the threshold circuit 24 following a multiplier circuit 36 achieves equivalent results with less sensitivity attributable to the control 26. As shown in FIG. 1, the threshold circuit 24 will be placed in either of the two indicated locations within the detail processor 10.

A wave shaping circuit 28 is shown enclosed within the dashed line block in FIG. 1. This circuit includes, for example, an amplifier-limiter circuit 30. While not indispensable for effective operation of the detail processor 10, the amplifier-limiter essentially functions to shape the boost curve for high transition levels.

After the amplifier-limiter circuit 30, the wave shaping circuit divides into two parallel paths, a first path extending through a delay matching circuit 32 to one input of the four quadrant multiplier 36. A second path from the amplifier-limiter leads through a full wave rectifier, filter and shaper circuit 34 whose characteristics will be discussed in more detail in conjunction with FIGS. 3A and 3B. The first path delay match circuit 32 provides a delay to match the process delays taken by the circuit 34.

The multiplier circuit 36 multiplies the delayed first path signal from the delay match circuit 32 by the second path signal put out by the shaper circuit 34 to yield a boost signal having the desired amplitude response in order to improve the rise time of small transitions in the output adder circuit 18 without modifying the large level transitions thereat (i.e. without any loss of bandwidth in the main path 14).

The main path delay match circuit 16 provides suitable main path delay to enable the main path video signal to be added in proper time and phase in the adder circuit 18 with the boost signal put out by the multiplier 36.

An optional element, namely a level control by chroma and luminance circuit 38, may be placed in the path between the multiplier 36 and the adder 18 as shown in FIG. 1. This circuit 38 is discussed in greater detail in conjunction with FIGS. 4A and 4B hereinafter.

Figure 2:
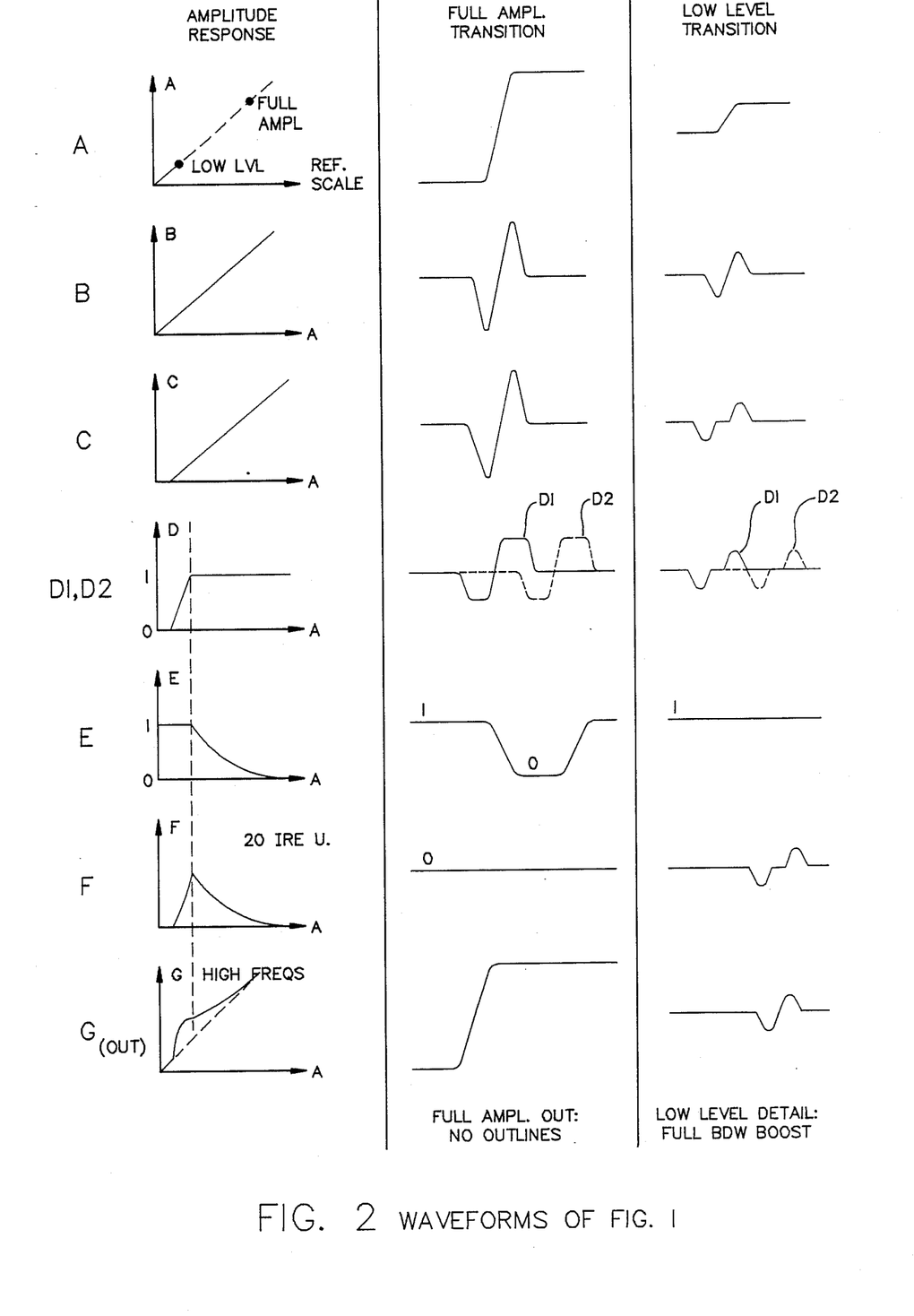
FIG. 2 is a series of waveform graphs of amplitude response and transition signals at high transition levels and at low transition levels at indicated points of the FIG. 1 apparatus.

Referring now to the waveform graphs of FIG. 2, the signal at the video input 12 is graphed as waveforms A. The leftmost column of waveforms depict amplitude response for the various signals at the locations in the FIG. 1 circuit indicated by the alphabetic reference characters, with amplitude plotted against a common reference scale. The middle column indicates full amplitude transition characteristics; and, the rightmost column depicts low level transition characteristics at the indicated locations.

Thus, the leftmost waveform A depicts video input amplitude response at a low level and for full amplitude (as shown in broken line). The middle waveform A depicts a full amplitude (e.g. zero to 100 IRE units) transition at the input 12, and the right waveform A depicts a low level transition at the input 12.

Waveforms B depict the high frequency transition signal generated by the circuit 22 in response to both full amplitude and low level transitions.

Waveforms C depict the operation of the adjustable threshold circuit 24 to provide a minimum threshold level below which there is no signal output.

Waveforms D1 and D2 depict the signal amplifying limiting processes carried out within the circuit 30. The time delay resulting from the first path delay match circuit 32 is graphed in broken lines in the middle and right column waveforms D2.

The wave shaping characteristics of the full wave rectifier, filter and shaper circuit 34 are depicted as waveforms E. For high levels, the transition interval output approaches zero value, while for low levels (e.g. at 20 IRE units and below) the transition interval output approaches unity value. As can be seen in the leftmost column waveform E, from about 20 IRE units to 100 IRE units the output characteristic is a curve extending downwardly from unity to zero value over the 20-100 IRE units range.

The boost signal output from the multiplier 36 is depicted as waveforms F. As can be seen in the middle column, for full amplitude transitions, the boost signal is zero value; and in the right column, the boost signal for low levels is the D2 waveform.

When the boost signal waveform F is added to the main path signal, the characteristics of waveforms G are obtained. At full amplitude output, there are no transition outlines as were present in some implementations of the referenced '304 patent. At low transition levels, details are given a full bandwidth boost.

Figures 3, 3A:
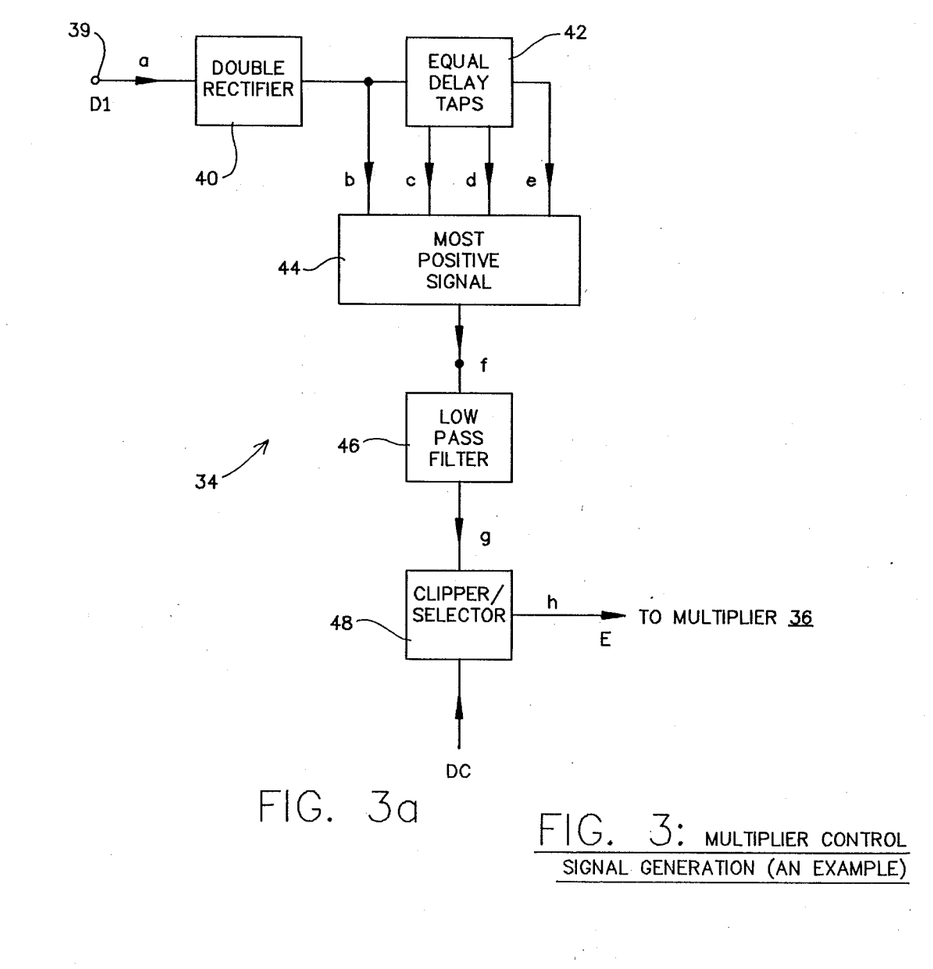
FIG. 3A is a more detailed block diagram of a wave shaping circuit element within the FIG. 1 block diagram apparatus.
Figure 3B:
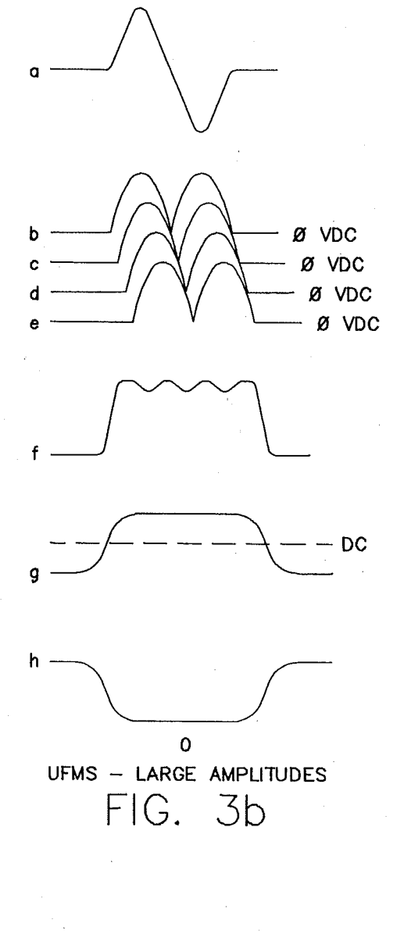
FIG. 3B is a series of waveform graphs of signals present at indicated points of the FIG. 3A apparatus.

One exemplary implementation of the shaping circuit 34 is given in FIG. 3A. Therein, an input 39 receives the D1 signal from e.g. the amplifier-limiter 30, graphed as waveform a in FIG. 3B. The numerical sign of this signal is thereupon removed by operation of a full wave rectifier 40. The output of the double rectifier 40 then passes through e.g. a 200 nanosecond delay line having equal 50 nanosecond delay taps. Then, the undelayed, and equally delayed signals, waveforms b, c, d, and e of FIG. 3B, are put through a most positive signal circuit 44 which functions to put out the most positive signal, waveform f of FIG. 3B, of all of the signals entering the circuit 44. The resultant signal is then passed through a low pass filter circuit 46 in order to remove the ripple, waveform g of FIG. 3B. The low pass filtered signal, waveform g, is then compared in a comparator circuit with a dc reference voltage level, graphed in reference to the waveform g signal in FIG. 3B. The result, waveform h (and waveforms E in FIG. 2) provides the second path signal to the multiplier 36.

Figure 4A:
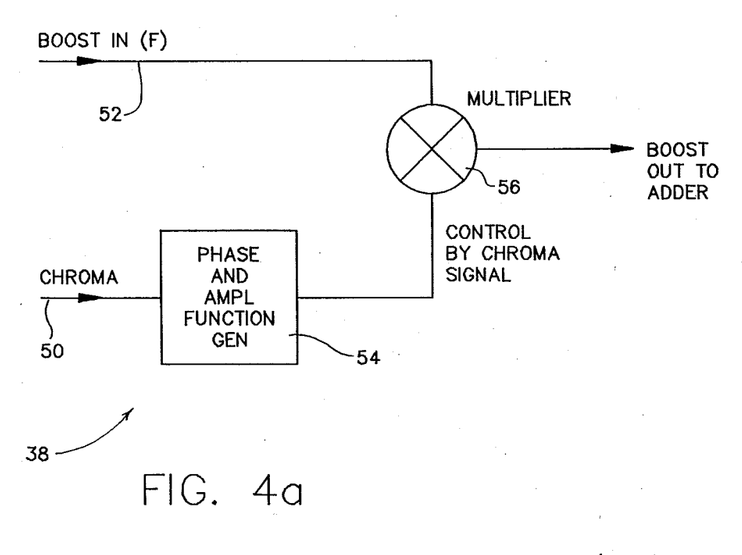
FIG. 4A is a block diagram of apparatus for controlling boost level by chroma conditions.
Figure 4B:
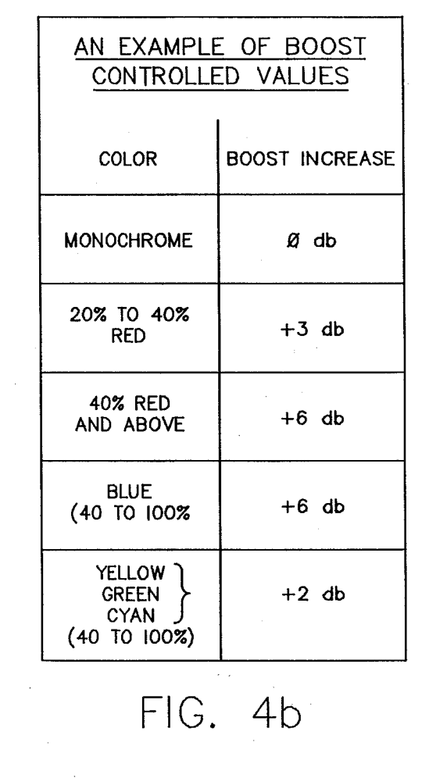
FIG. 4B is a table of chroma boost controlled values.

Boost level may be advantageously controlled by chrominance conditions, as illustrated in FIGS. 4A and 4B. The circuit block 38 of FIG. 1 may be implemented as shown in FIG. 4A to include a chroma input 50 and a boost input 52 leading from the multiplier 36. A chroma phase and amplitude function generator 54, depicted in structural detail in FIG. 8 provides a control lying between unity and zero as a function of chroma and luminance conditions, for example as in accordance with the table values set forth in FIG. 4B. A second multiplier 56 multiplies the boost signal waveform F by the chroma control signal put out by the circuit 54 to achieve the results tabulated in FIG. 4B.

Figure 5:
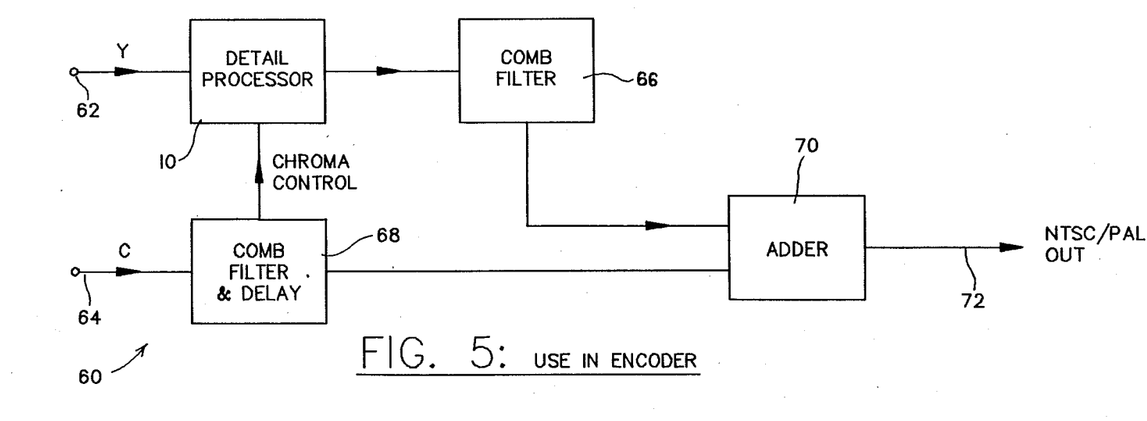
FIG. 5 is a block diagram of a television signal encode processing system including the detail processor of the present invention within a color encoder.

FIG. 5 depicts an encoding system 60 employing the teachings of U.S. Pat. 4,731,660, incorporated by reference, with or without the use of the threshold concept disclosed therein. The system 60 includes a luminance input 62 and a chrominance input 64. The detail processor 10 is connected to the luminance input and precedes a luminance comb filter 66. A chrominance comb filter 68 is connected to the chrominance input 64 and includes a delay matching circuit to take into account group delays occurring in the processor 10 and comb filter 66. The combed outputs from the filters 66 and 68 are then combined in an adder circuit 70 to provide a comb filter processed, low transition level boosted composite color television signal at an output 72, e.g. in either the NTSC or PAL standard color signal format.

Figure 6:
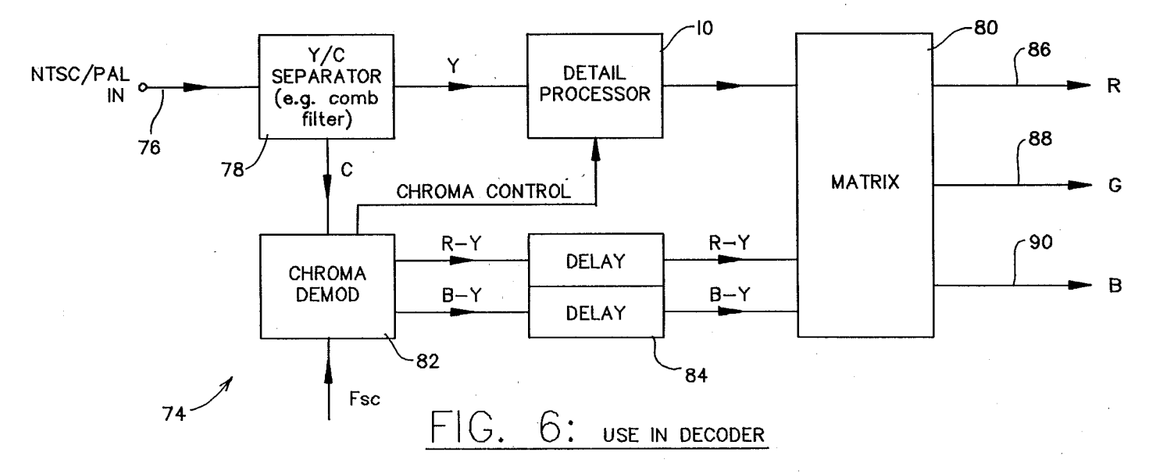
FIG. 6 is a block diagram of a television signal decode processing system including the detail processor of the present invention within a color decoder.

FIG. 6 depicts use of the present invention within a decoding system 74. A color composite input 76 receives a color signal in accordance with either the NTSC or PAL standard, for example. A chroma/luminance separator 78, such as a comb filter, separates the luminance and chrominance components of the signal. The luminance signal is then passed through the detail processor 10 of FIG. 1 and the resultant boosted luminance signal is then fed into a color decode matrix 80.

The chrominance component from the separator 78 is then passed through a chrominance demodulator 82 which receives a chroma subcarrier signal and puts out color difference signals such as red-green and blue-green signals. These signals are suitably delayed in a delay matching circuit 84 which is required to compensate for process delays occurring within the booster 10, and then they enter the color decode matrix 80. The matrix 80 puts out decoded red, green (which may be luminance) and blue components on lines 86, 88 and 90 respectively.

Figures 7, 7A:
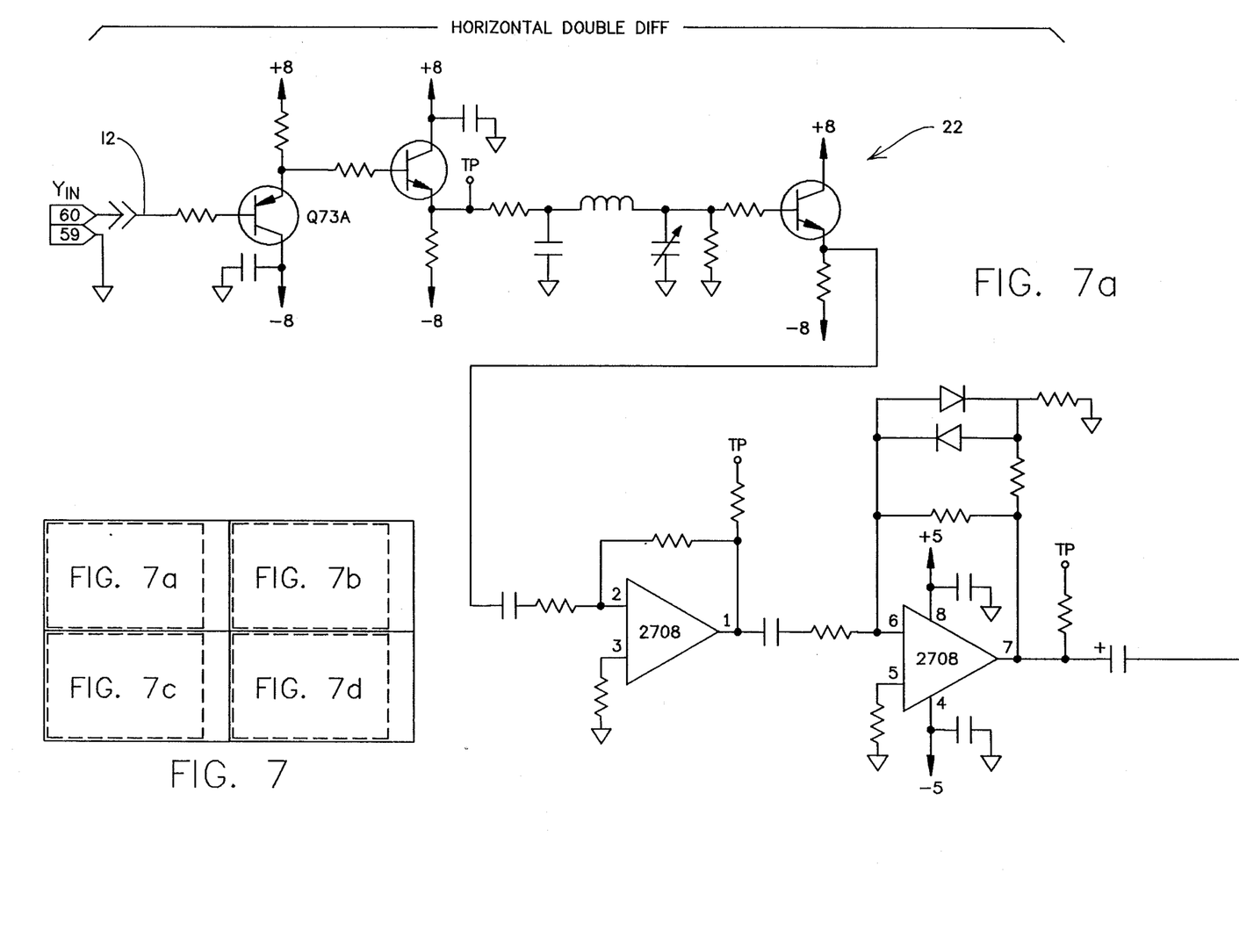
FIG. 7 comprises a layout plan for FIGS. 7A, 7B, 7C and 7D which, when arranged together as shown in FIG. 7, comprise a schematic diagram of the correction signal generator portion of the FIG. 1 block diagram up to, but not including the multiplier.
Figure 7B:
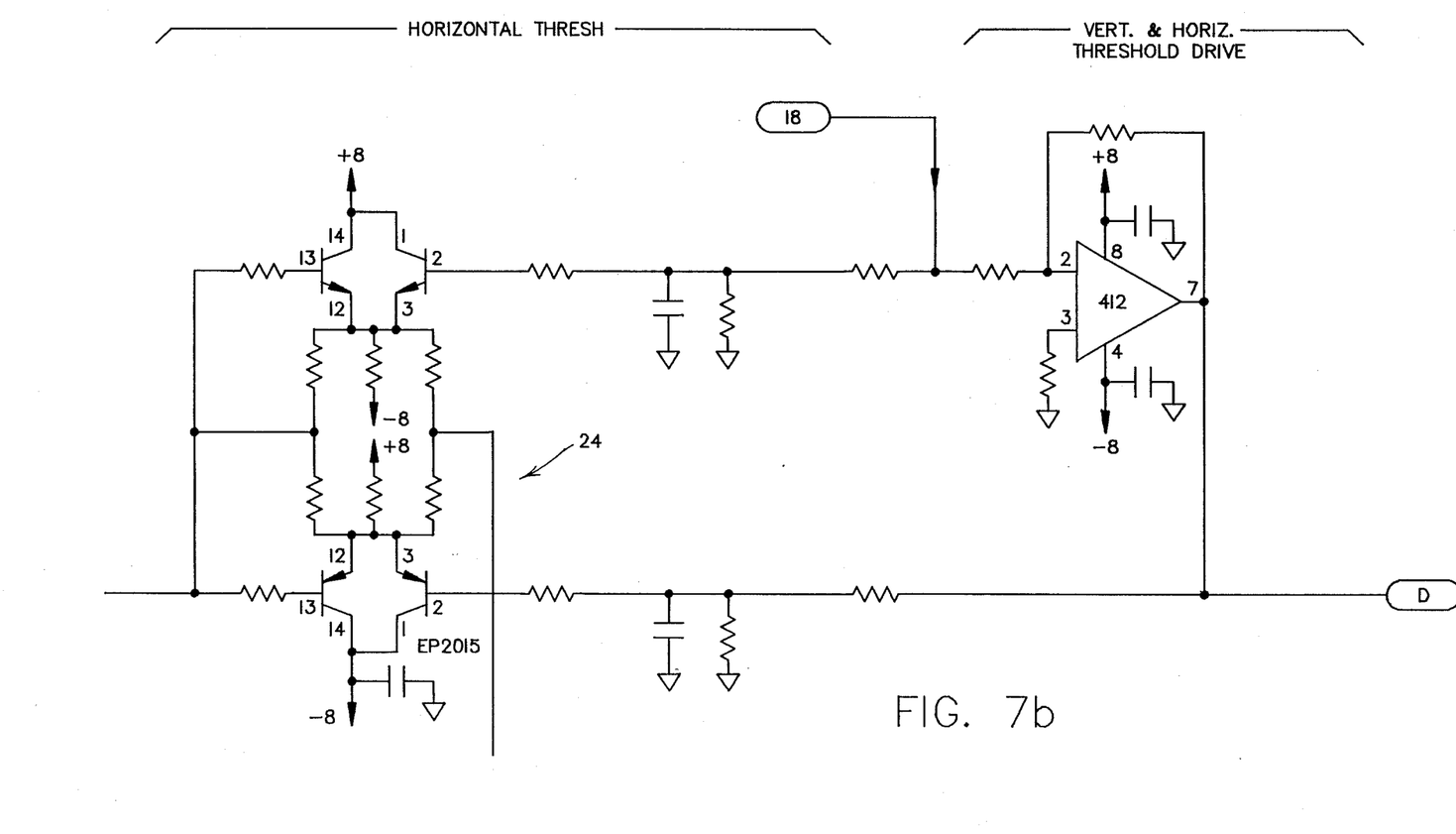
Figure 7C:
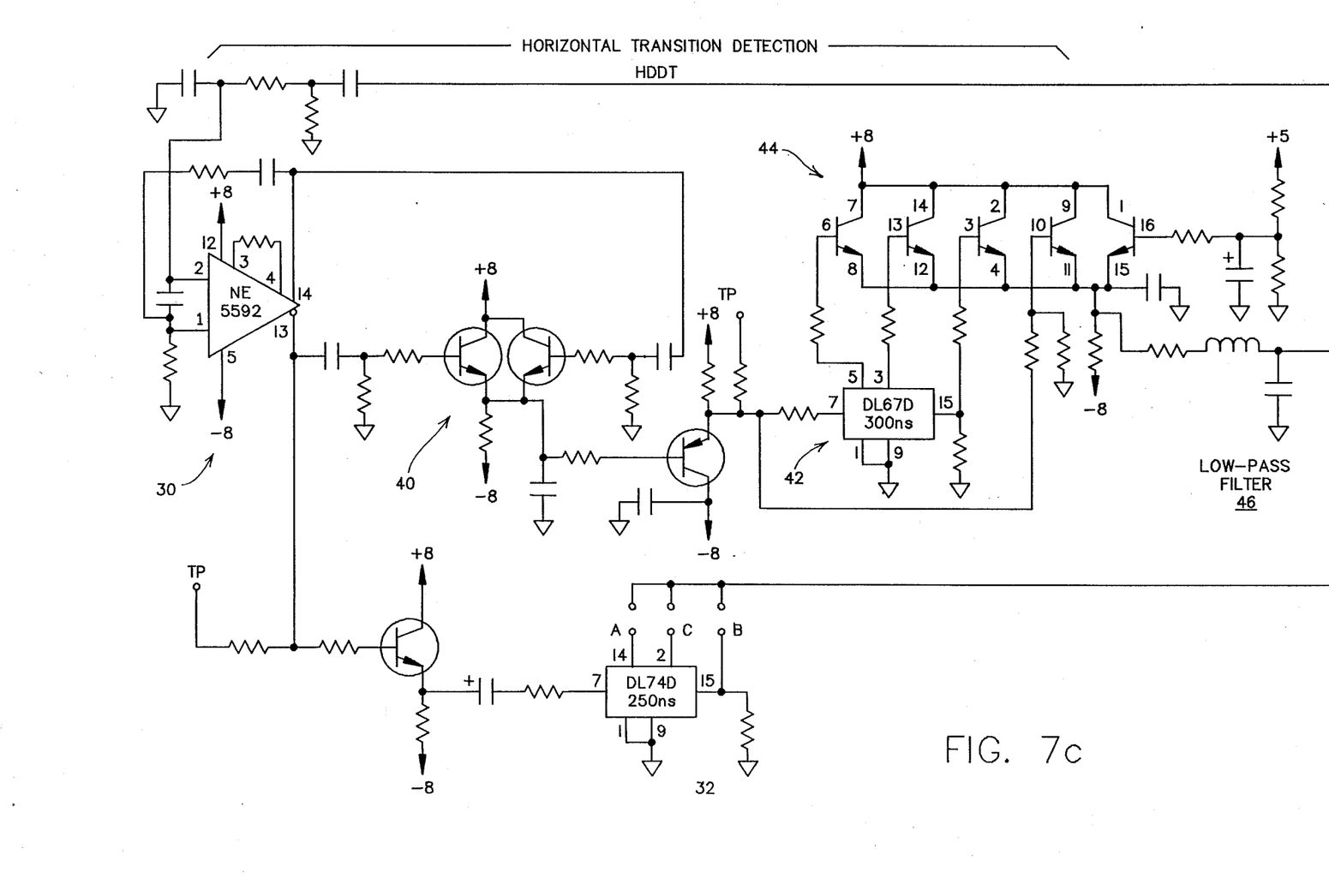
Figure 7D:
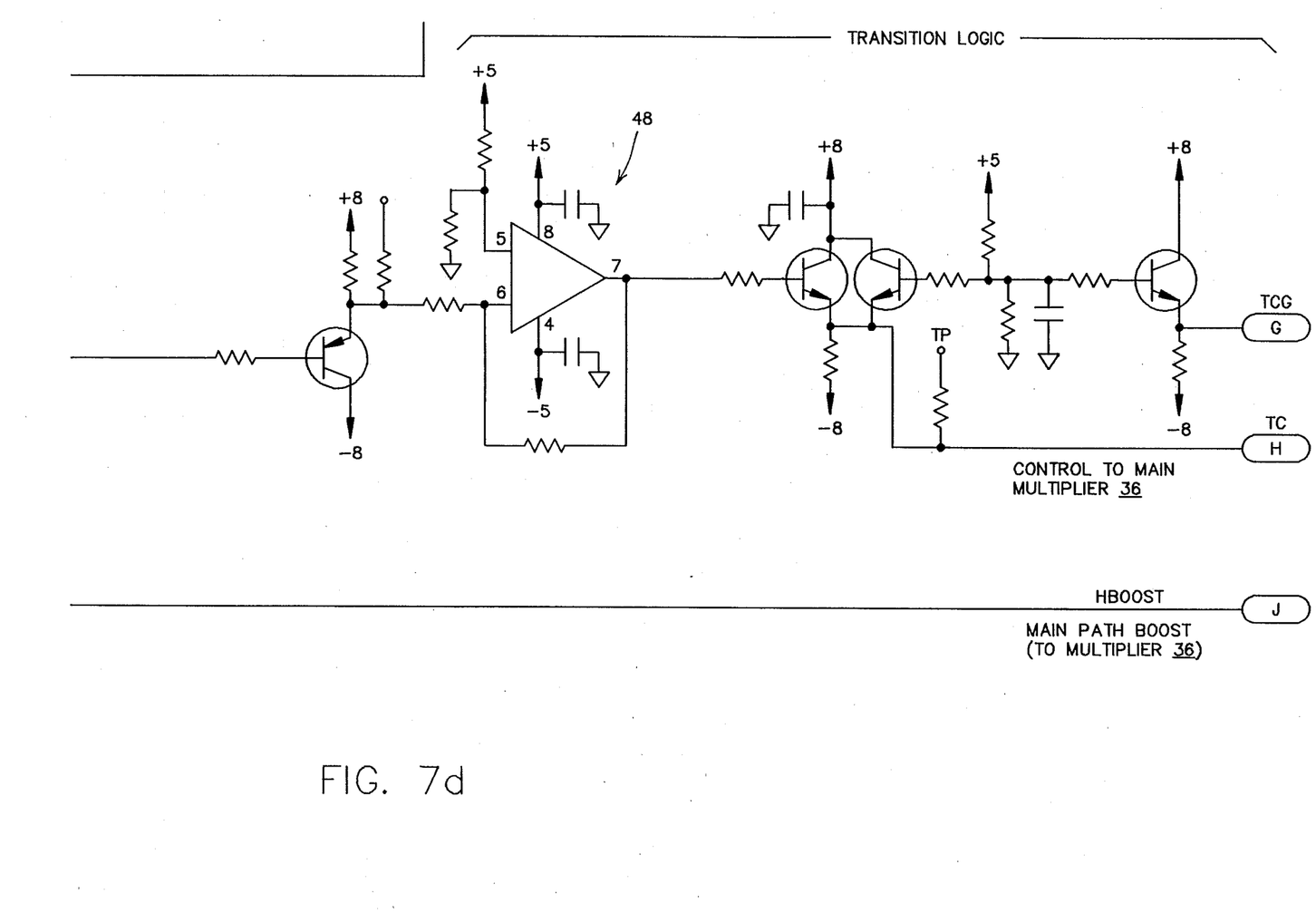
Figure 8A:
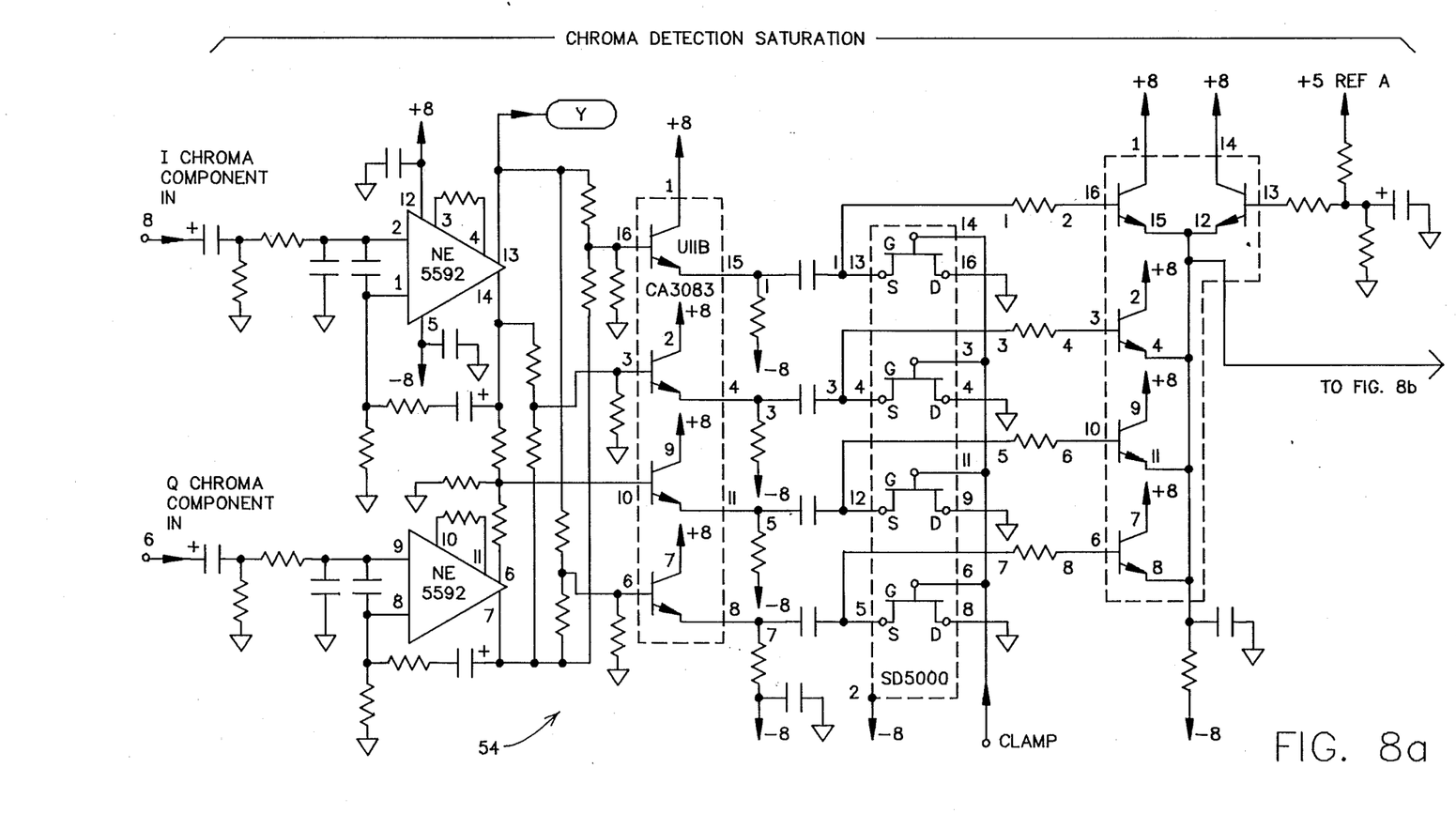
FIG. 8A is a left portion and FIG. 8B is a right portion of a schematic circuit diagram of the chroma/luminance control circuit block depicted in FIG. 4A.
Figure 8B:
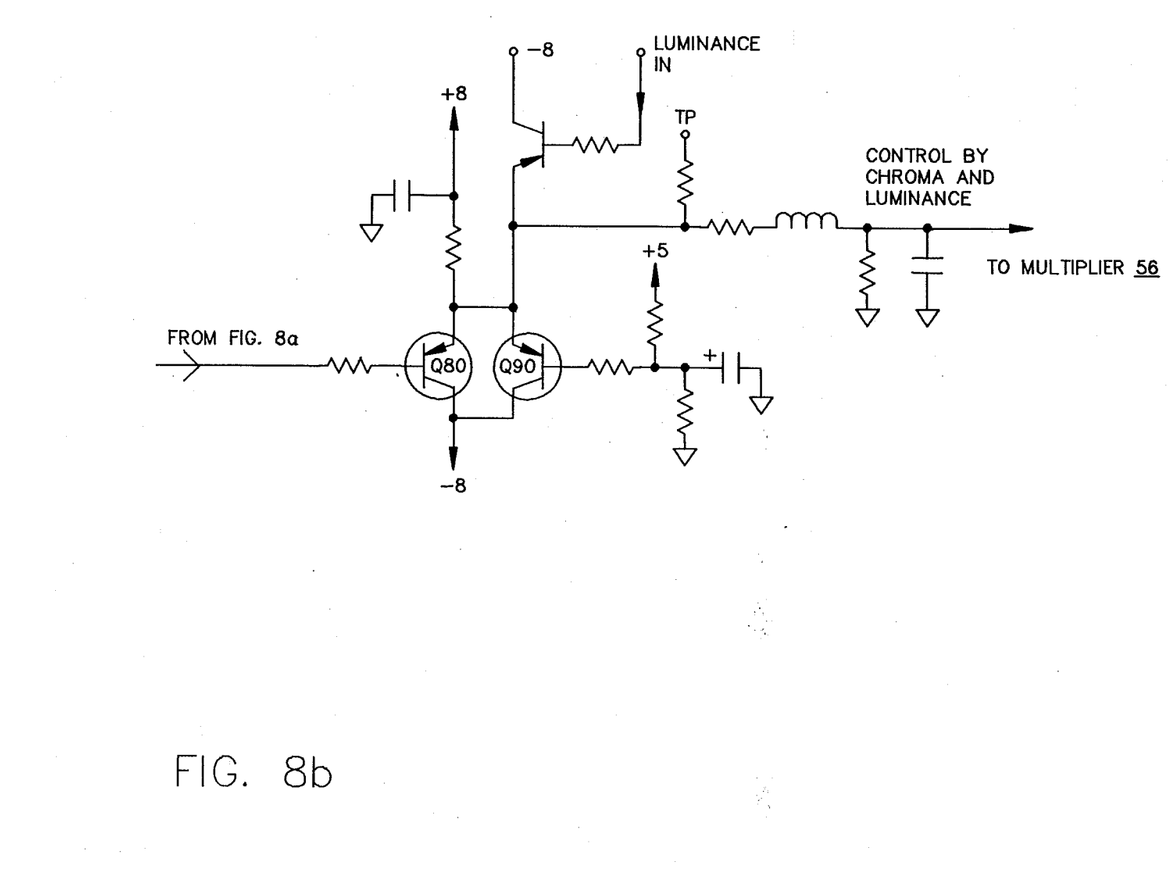
Figure 9:
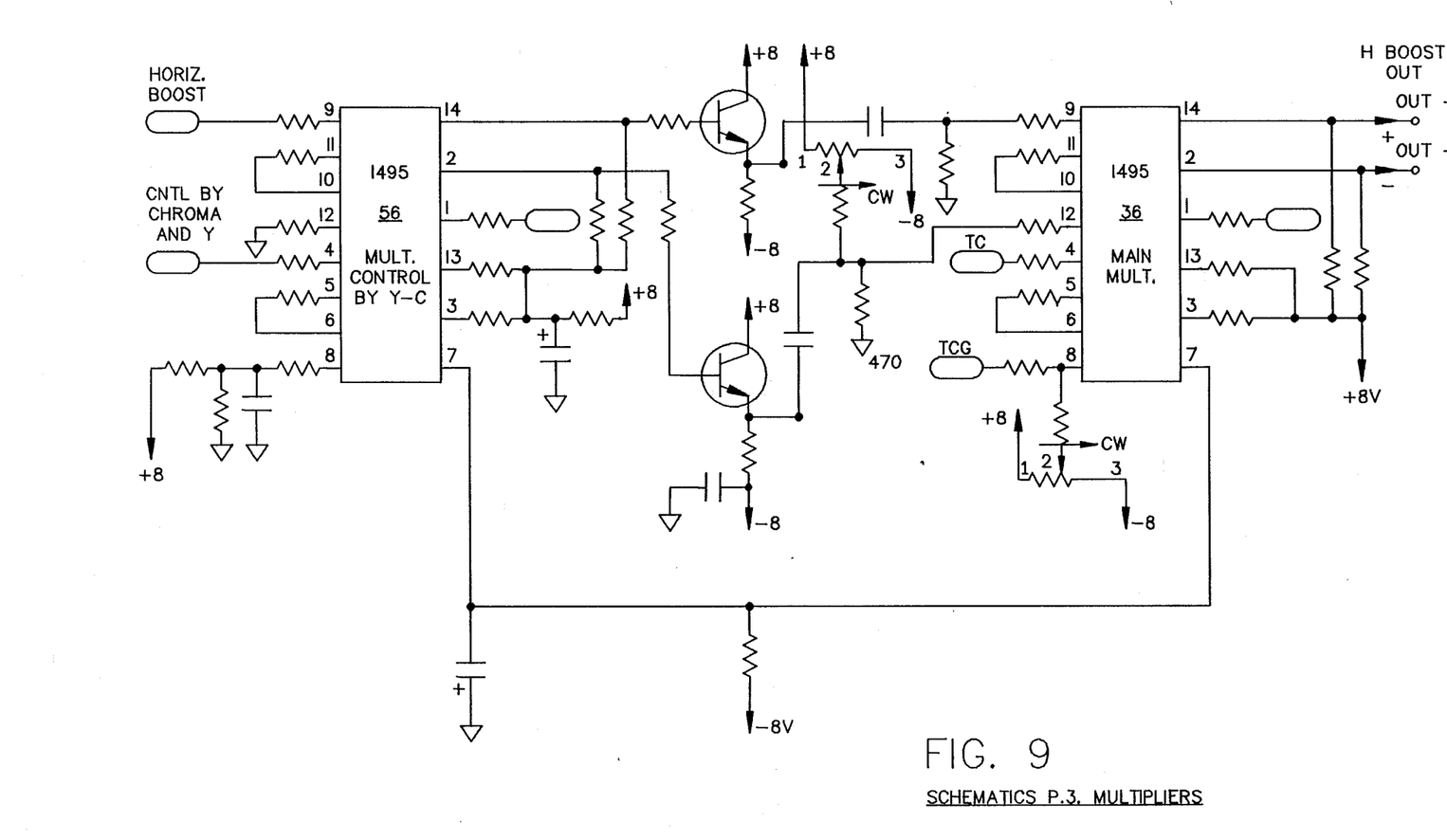
FIG. 9 is a schematic circuit diagram of the multiplier depicted in FIG. 4A.

FIGS. 7, 8 and 9 provide presently preferred circuit implementations of the various elements comprising the detail booster 10 depicted in the block diagrams. Those skilled in the art will be able to correlate the schematics to the functional requirements depicted for each element by use of common reference numerals; and, a detailed discussion of the schematics is deemed unnecessary.

To those skilled in the art to which this invention relates, many changes in construction and widely differing embodiments will suggest themselves without departing from the spirit and scope of the invention. The disclosures and the description herein are purely illustrative and are not intended to be in any sense limiting.

We claim:

1. In a television system a transition level signal booster for decreasing transition time of low level transitions within a video signal without creating artifacts incident to high transition levels within the video signal, the booster comprising:
   an input for receiving the video signal,
   an output for putting out a main path video signal in which transition times of low level transitions have been decreased,
   a main path for the video signal extending between the input and the output, the main path including a main path adder means for adding a transition boost signal to the video signal,
   transition boost signal generation means including a connection to said input for receiving the video and for generating the transition boost signal, the generation means comprising:
   high frequency transition signal generation means for generating a high frequency transition signal incident to the detection of a transition level in said video signal,
   wave shaping means including a first path including delay matching means in series therein for putting out a first signal and a second path in parallel with the first path, the second path including sign removal and shaper means therein for generating a second signal having a decreasing amplitude for each video transition having a magnitude above a predetermined amount,
   multiplier means for multiplying the first control signal by the second control signal to generate the transition boost signal, said multiplier means being connected to said main path adder means so that said transition boost signal may be added to the main path video signal, thereby to decrease the transition times of low level transitions.

2. The transition level signal booster set forth in claim 1 wherein said transition boost signal generation means comprises threshold providing means for enabling said transition boost signal to be generated only for low transition level signals which are above a threshold level.

3. The transition level signal booster set forth in claim 2 wherein said threshold providing means is adjustable so that said transition boost signal is not generated incident to noise.

4. The transition level signal booster set forth in claim 2 wherein said threshold providing means is located in the transition signal generation means between said high frequency transition signal generation means and said wave shaping means.

5. The transition level signal booster set forth in claim 2 wherein said threshold providing means is located in the transition signal generation means following said multiplier means and before said main path adder means.

6. The transition level signal booster set forth in claim 1 wherein said main path further includes delay matching means for providing a predetermined proper delay to energy groups of said main path video signal so as to provide phase matching with delay of said transition boost signal.

7. The transition level signal booster set forth in claim 1 wherein said high frequency transition signal generation means within said transition signal generator comprises a second differentiation circuit which generates a second differential function of each video transition passing therethrough.

8. The transition level signal booster set forth in claim 1 wherein said wave shaping means includes in the second path thereof full wave rectifier means for removing the sign of the second signal; delay line means connected to the double rectifier means and having plural time delay increment taps, for delaying the second control signal by a plurality of time delay increments; most positive signal selection means connected to the double rectifier means and to the tapped delay line means for selecting and putting out the most positive signal received from the full wave rectifier means and from the plural time delay increment taps; low pass filter means connected to the most positive signal selection means for low pass filtering the most positive signal selected; and, analog comparator means for comparing the low pass filtered signal and a dc reference value means to put out said second control signal as a zero value signal throughout intervals of large level video transitions.

9. The transition level signal booster set forth in claim 1 wherein said video signal is the luminance component of a color television video signal and further comprising chroma control signal generation means responsive to chroma components of said color television video signal for generating a chroma control signal having a value lying in a range between zero and unity for controlling the transition boost signal in accordance with chroma conditions of the video signal, and second multiplier means connected to multiply said transition boost signal by said chroma control signal, the output of said second multiplier being connected to said main path adder means.

10. The transition level signal booster set forth in claim 9 wherein said chroma control signal provides a zero decibel boost increase for monochrome, a plus two decibel boost increase for yellow, green or cyan chroma components having an amplitude lying in a range between 40 and 100 IRE units, a plus three decibel boost increase for red chroma components having an amplitude lying in a range between 20 and 40 IRE units, and a plus six decibel boost for red and blue chroma components having an amplitude between 40 and 100 IRE units.

11. The transition level signal booster set forth in claim 1 included within a luminance path of a television color video signal encoder.

12. The transition level signal booster set forth in claim 11 wherein said television color encoder includes a luminance input to which the transition level signal booster is connected, and a luminance comb filter following said booster in said luminance path; and a chrominance input leading to a chrominance comb filter; outputs from the luminance comb filter and chrominance comb filter being combined by adder means into a composite color television signal.

13. The transition level signal booster set forth in claim 1 included within a luminance path of a television color video signal decoder.

14. The transition level signal booster set forth in claim 13 wherein said television color video signal decoder includes a composite color video input, a chroma/luminance component separator circuit for separating chroma into a chroma path and luminance into a luminance path, the transition level signal booster being connected in said luminance path, and a chrominance demodulator being connected in said chroma path; and, a color decode matrix for decoding boosted luminance from said transition level signal booster and properly time delay matched color components from said chroma demodulator into color components, such as red, green and blue.

15. In a television system a method for decreasing transition time of low level transitions within a video signal without creating artifacts incident to high transition levels within the video signal, the method comprising the steps of:
receiving the incoming video signal at a main path adding a transition boost signal to the video signal in the main path,
putting out at an output a main path video signal in which transition times of low level transitions have been decreased,
generating the transition boost signal from the incoming video signal by:
generating a high frequency transition signal incident to the detection of a transition level in said video signal,
wave shaping said high frequency transition signal including:
passing said transition signal through a delay matching first path for putting out a first control signal, and
passing said transition signal through a second path wherein the sign of said transition signal is removed and the resulting absolute value thereof is shaped in accordance with a predetermined curve having a decreasing amplitude for each video transition of an amplitude above a predetermined amount,
multiplying of the first control signal by the second control signal in order to yield the transition boost signal.

16. The method for decreasing transition time of low level transitions within a video signal as set forth in claim 15 wherein the step of generating said transition boost signal comprises the step of establishing a minimum threshold above which said transition boost signal is generated.

17. The method for decreasing transition time of low level transitions within a video signal as set forth in claim 16 including the step of making said threshold adjustable so that said transition boost signal is not generated incident to noise levels.

18. The method for decreasing transition time of low level transitions within a video signal as set forth in claim 16 wherein said step of establishing a minimum threshold is carried out between said high frequency transition signal generating step and said wave shaping step.

19. The method for decreasing transition time of low level transitions within a video signal as set forth in claim 16 wherein said step of establishing a minimum threshold is carried out following the multiplication step.

20. The method for decreasing transition time of low transition levels within a video signal as set forth in claim 15 further including the step of delay matching within said main path so as to provide phase matching between energy groups of said main path video signal and energy groups of said transition boost signal.

21. The method for decreasing transition time of low level transitions within a video signal as set forth in claim 15 wherein the step of generating a high frequency transition signal comprises the step of deriving a second differential function of each video transition passing therethrough.

22. The method for decreasing transition time of low transition levels within a video signal as set forth in claim 15 wherein the step of wave shaping includes in the second path the steps of:
full wave rectifying to removing the sign of and render an absolute value for the second control signal;
delaying the second control signal by a plurality of time delay increments;
selecting and putting out the most positive signal of the plurality of time delay increments;
low pass filtering the most positive signal selected; and
comparing the low pass filtered signal and a dc reference value means to put out said second control signal as a zero value signal throughout intervals of large level video transitions.

23. The method for decreasing transition time of low level transitions within a video signal as set forth in claim 15 wherein said video signal is the luminance component of a color television video signal and further comprising the step of generating a chroma control signal having a value lying in a range between zero and unity for controlling the transition boost signal in accordance with chroma conditions of the video signal, and the step of multiplying said transition boost signal by said chroma control signal to provide a chroma controlled boost signal;

24. The method for decreasing transition time of low transition levels within a video signal as set forth in claim 23 wherein the step of generating said chroma control signal results in a zero decibel boost increase for monochrome, a plus two decibel boost increase for yellow, green or cyan chroma components having an amplitude lying in a range between 40 and 100 IRE units, a plus three decibel boost increase for red chroma components having an amplitude lying in a range between 20 and 40 IRE units, and a plus six decibel boost for red and blue chroma components having an amplitude between 40 and 100 IRE units.

25. The method for decreasing transition time of low level transitions within a video signal as set forth in claim 15 carried out within a luminance path of a television color video signal encoding process.

26. The method for decreasing transition time of low level transitions within a video signal as set forth in claim 25 wherein said television color video signal encoding process includes the steps of luminance comb filter processing of a boosted luminance component following the steps of said method for decreasing transition time of low transition levels, and chrominance comb filter processing of a chrominance component, and combining the boosted luminance component and the chrominance component in an adder circuit to provide a composite color television signal.

27. The method for decreasing transition time of low level transitions within a video signal as set forth in claim 15 carried out within a luminance path of a television color video signal decode process.

28. The method for decreasing transition time of low level transitions within a video signal as set forth in claim 27 wherein said television color video signal decode process includes the steps of:

separating chroma into a chroma path and luminance 1 into a luminance path, performing the method for decreasing transition time of low level transitions within the luminance path, and demodulating chrome in said chroma path; and, decoding boosted luminance and demodulated chroma in order to provide color components, such as red, green and blue.

* * * * *